July 29, 1958 J. R. KRUSE, JR 2,845,535

INTERLACED TIMER

Filed Aug. 6, 1954

INVENTOR.
John R. Kruse, Jr.
BY
Harness, Dickey & Pierce
ATTORNEYS.

United States Patent Office 2,845,535

Patented July 29, 1958

2,845,535

INTERLACED TIMER

John R. Kruse, Jr., Lancaster, Ohio, assignor to Diamond Power Specialty Corporation, Lancaster, Ohio, a corporation of Ohio Application August 6, 1954, Serial No. 448,349

9 Claims. (Cl. 250—36)

Figure 1:
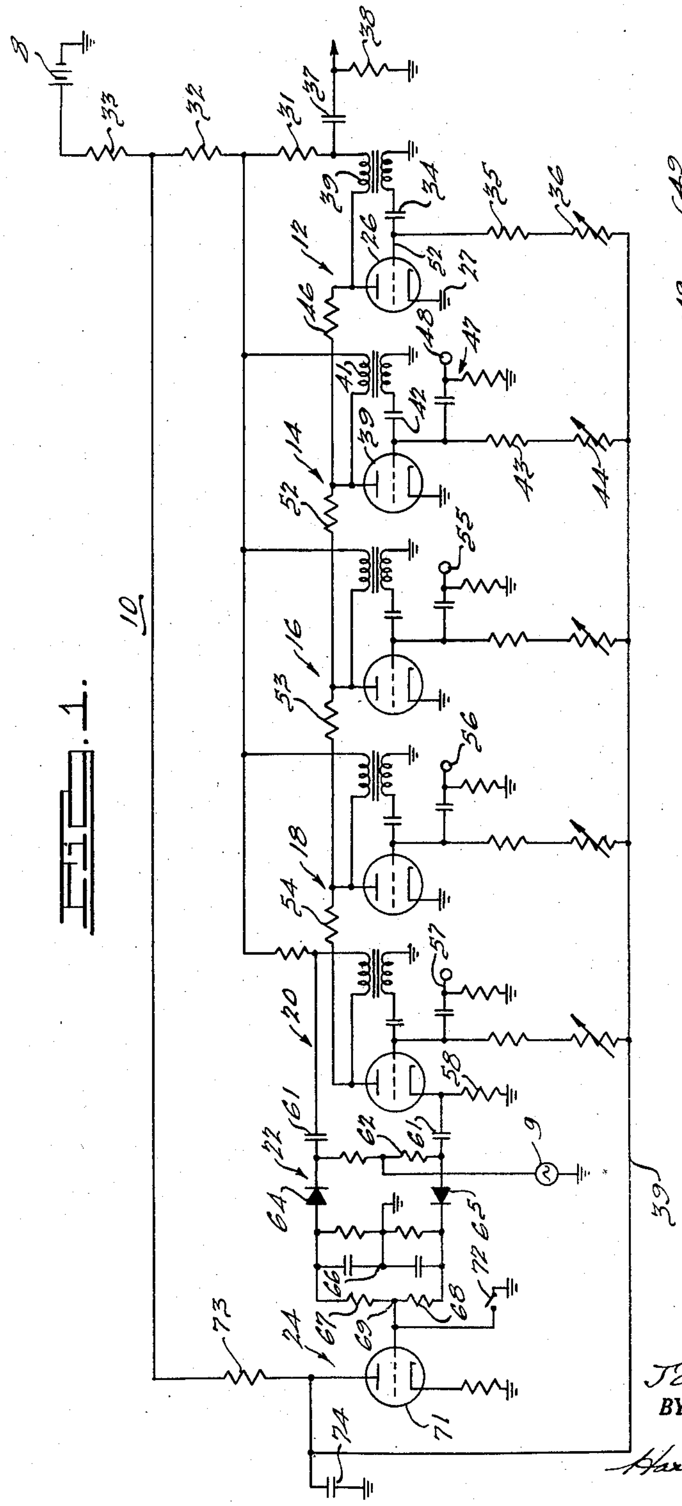
Figure 2:
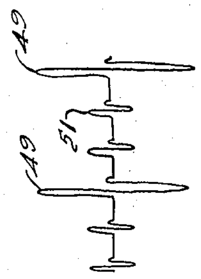
Figure 3:
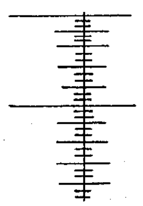
Figure 4:
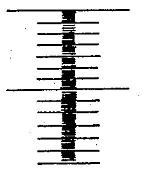
Figure 5:
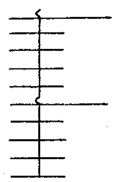

The present invention relates to electrical generator circuits and more particularly to an improved electrical interlaced timer circuit for a video transmitting apparatus employing an interlaced scanning system.

In video transmitting apparatus employing an interlaced scanning system, the timing of the horizontal and vertical synchronizing pulses and the equalizing pulses of a video signal must be accurately related to each other in order to obtain a clear video picture. Conventionally, accurate timing is obtained in a transmitting apparatus by employing a master oscillator and a frequency divider chain comprising a number of count-down stages which divide the master oscillator frequency into submultiple frequencies. In the past, it has been customary to couple the count-down stages by the use of low-side coupling, that is, coupling immediately preceding and following count-down stages between their control grids or cathodes. Since these points are quite sensitive to signal amplitude, such arrangements have not been too satisfactory inasmuch as the circuits required critical adjustment and further, the count-down stages produced undesired reactions upon their following or preceding stages during adjustment of one stage such that readjustment of the other stages was required. It has also been customary to lock the various stages and the master oscillator to a 60 cycle power line by applying a D.-C. bias or potential to the control grids of the oscillator tubes in these circuits. With low-side coupling, the grids are quite sensitive so that it is usually necessary to isolate the inputs of these circuits to apply the D.-C. bias or potential.

One of the objects and features of the present invention is to provide an improved interlaced timer which eliminates the foregoing difficulties by employing high-side or plate coupling between the various oscillator stages.

Another object of the invention is to provide an interlaced timer circuit which is so arranged that a locking bias potential may be applied to each of its oscillator stages without isolating the control grids of the individual oscillator tubes.

A further object of the present invention is the provision of an interlaced timer for generating electrical synchronizing impulses for the horizontal and vertical frequencies of a video signal and to lock these frequencies to a power-line frequency in a more stable manner.

Still another object is to provide an improved interlaced timer having a stable tie-in to power-line frequency with respect to changes in the B+ supply voltage of plus or minus 50 volts and a stable tie-in to power-line voltage with respect to frequency variations of said power-line voltage of plus or minus three cycles.

A still further object of the invention is to provide a simple interlaced timer in which the individual stages may be easily and quickly adjusted without producing undesirable reactions upon a previously adjusted, adjoining stage.

Yet another object of the present invention is the provision of an improved, inexpensive, interlaced timing circuit which eliminates many of the components heretofore used and which is stable in operation.

With these and other objects in view as will hereinafter more fully appear and which will more clearly be pointed out in the appended claims, reference is now made to the following description taken in connection with the accompanying sheet of drawing in which:

Figure 1 is a schematic diagram of an electrical interlaced timer comprising a preferred embodiment of the present invention; and Figs. 2, 3, 4 and 5 are diagrams illustrating the relative amplitude and frequency divisions of the signals found in the different circuits of the invention.

Referring now to the drawing, there is shown in Fig. 1 an electrical interlaced timer 10 embodying features of the present invention and including a master or top oscillator 12, a frequency divider chain comprising a plurality of series connected count-down oscillators or stages 14, 16, 18 and 20, respectively, a phase-comparator circuit 22, and a direct current amplifier 24. As will hereinafter more fully be disclosed, master oscillator 12 is initially adjusted to provide an output signal having a frequency of 31.5 kc. which is fed to the first count-down oscillator 14 of the frequency divider chain. Oscillator 14 subdivides the frequency by three and feeds its output signal to the following oscillator 16 such that the frequency is successively divided by 5, 7 and 5 in oscillators 16, 18 and 20, respectively. The output signal from oscillator 20, which has a frequency of 60 cycles, is then injected into phase-comparator 22 along with a 60 cycle sinusoidal wave of a conventional alternating current power supply line. Should the relative phases of the two signal waves differ from each other, a direct current potential signal or bias is developed in the output of phase-comparator 22, amplified in D.-C. amplifier 24 and applied to the control grids of the oscillator tubes for pulling the oscillators back into correct frequency such that the oscillator frequencies are locked to the power-line frequency.

Each of the oscillators including the master and count-down oscillators is similar in basic construction but varies in the relative values of its respective components. Inasmuch as the oscillators, which are of the blocking oscillator type, are substantially similar in construction and operate in similar manners, it is believed that a detailed description of the master oscillator and its following count-down oscillator 14 will be sufficient to provide a complete understanding of their operation and as such, reference to oscillators 16, 18 and 20 will be limited in the description below to their overall function or specific features otherwise incorporated therein.

Master or top oscillator 12 includes an electronic vacuum tube 26 preferably of the triode type having the usual cathode, plate and control grid elements. The cathode element of tube 26 is placed at ground potential by connection 27 while the plate element is connected to a suitable B+ power supply through the primary of a grid-coupling transformer 30, plate load resistor 31 and a pair of series connected voltage dropping resistors 32 and 33. The secondary winding of transformer 30 is grounded on one end and has its other terminal connected to a capacitor 34 which in turn is connected to the control grid element of tube 26. Also connected to the control grid element is a pair of grid-leak resistors 35 and 36 of which resistor 36 is adjustable. Capacitor 34 and resistors 35 and 36 provide the R-C timing circuit for the blocking oscillator such that the relative values of capacitor 34 and the sum of resistors 35 and 36 determine the R-C time constant of the oscillator and hence, the frequency of its signal output.

The basic construction of the oscillator as described thus far is substantially conventional and it will be readily understood that: when a power supply potential is applied to the plate element, current flows in tube 26 from cathode to plate and through the primary of transformer 30. This initial current flow induces a potential in the secondary winding of transformer 30 such as to make the grid element more positive whereby the current flow increases through the tube and transformer. The increase in current flow further increases the positive potential in the grid circuit causing a further increased plate current. The process continues until tube 26 reaches saturation such that current ceases to increase in the plate circuit and no voltage is induced across the secondary winding. During this process, capacitor 34 is charged but when a voltage fails to be induced in the grid circuit, the capacitor discharges through resistors 35 and 36 and places a negative potential on the control grid which acts to decrease the current flow through the tube. This changing current flow induces a potential in the secondary of transformer 30 in a manner which further increases the negative charge on the control grid and the process is continued until the tube reaches its cut-off value whereby current ceases to flow in tube 26 and no voltage is induced across transformer 30. Capacitor 34, during this half cycle, was negatively charged such that after cut-off, it again discharges through resistors 35 and 36, line 37, capacitor 74 and to ground. When capacitor 34 discharges, the grid of tube 26 is raised above cut-off and the entire cycle begins again.

It is readily observed from the above that the frequency of oscillation in the circuit will be initially determined by the time necessary for capacitor 34 to discharge through resistors 35 and 36 and thus, by the relative values of this R-C circuit. By varying resistor 36, the constants of the R-C timing circuit are varied and the frequency of the oscillator adjusted or changed. A portion of the signal output from oscillator 12 is taken across load resistor 31 and fed to a horizontal amplifying circuit of a forward stage (not shown) through a resistance-capacitance coupling circuit including capacitor 37 and grounded resistor 38.

Count-down oscillator 14 is similar to master oscillator 12 and includes a triode electronic tube 39 having its plate connected to the B+ power supply through the primary of a grid-coupling transformer 41 and voltage dropping resistors 32 and 33, while its cathode is led directly to ground. The secondary of transformer 41 which has one terminal grounded, is connected at its other terminal to the control grid of tube 39 through capacitor 42. The control grid is also connected to grid-leak resistors 43 and 44 of which 44 is adjustable. As in master oscillator 12, the frequency of oscillator 14 is controlled in the main by the R-C timing circuit including capacitor 42 and resistors 43 and 44. In order to accurately determine the frequency and amplitude of the signal appearing in count-down oscillator 14, a conventional coupling circuit 47 is inserted into the control grid circuit and provided with a test point 48.

Frequency division is obtained in this stage by applying a portion of the signal from oscillator 12 to oscillator 14 and setting the R-C time constant in the latter's grid circuit to the desired submultiple frequency of the incoming signal. To couple the master oscillator and first count-down oscillator together, high-side coupling is employed; that is, the coupling is through the plate circuits of the two oscillators. For this purpose, a resistor 46 is connected directly to the plate elements of tubes 26 and 39. It will be apparent that this coupling is between two relatively insensitive points of the oscillators inasmuch as it requires a much larger signal amplitude on the plate of an oscillator to effect its frequency than is required on the grid or cathode. Because of this, it is extremely difficult if not impossible for an oscillator-pulse to affect the frequency of the preceding oscillator which is controlling it.

As indicated heretofore, the constants in the R-C timing circuit of oscillator 14 are set to a submultiple frequency of one-third the master oscillator frequency such that its normal frequency of oscillation will be one-third the frequency of the master oscillator. To keep the two oscillators in step with respect to time, a portion of the output signal from oscillator 12 is fed to oscillator 14 through resistor 46 with the arrangement being such that upon receiving a total of three impulses from the master oscillator, the potential on capacitor 42 builds up sufficiently to overcome the bias on tube 39 whereupon oscillation of stage 14 begins to produce one cycle. To effect this triggering action, coupling resistor 46 is initially given or adjusted to such a value that the signal impulses applied from master oscillator 12 to count-down oscillator 14 appear at test point 48 with an amplitude approximating a third of the amplitude of the count-down oscillator pulses. This is clearly shown in Fig. 2 wherein typical wave forms of the signal appearing at test point 48 is shown and the relative amplitude of the count-down oscillator pulses 49 to the applied pulses 51 is approximately one-third.

Attention is directed to the fact that the coupling between the stages is two-way and that coupling resistor 46 effectively operates into an inductive load comprising transformer 41. This coupling constitutes a differentiating coupling. With a differentiating coupling of this type, low frequency signal components are attenuated therein with respect to the high frequency signal components and the width of the signal impulses transmitted therethrough are narrowed considerably. In effect, the coupling acts to considerably reduce the amount of energy and its time duration delivered from the lower frequency count-down oscillator 14 to master oscillator 12 and to slightly reduce the higher frequency signal energy passed from oscillator 12 to oscillator 14. While this arrangement permits the passing of sufficient energy to initiate the start of the oscillator, the energy delivered in either direction is not sufficient to hold an oscillator in paralyzed condition. It will be appreciated that since the time determining constants of oscillation are in the grid circuits, any disturbing element or effects caused by this differentiating time determination will be removed therefrom, due to the relative remoteness of these time determinations.

Each of the serially connected count-down oscillators 16, 18 and 12 is basically similar to oscillator 14 and is high-side coupled to its adjoining oscillator through coupling resistors 52, 53 and 54, respectively. As shown in Fig. 1, these resistors are series connected with coupling resistor 46 such that some signal energy will be fed from the top oscillator to the succeeding lower oscillators. However, due to the values of the coupling resistors, the energy passed beyond a succeeding oscillator will be relatively small and in effect, may be neglected. The relationship between adjoining count-down oscillators 14, 16 and 18 is identical as that between oscillators 12 and 14 but their R-C constants are adjusted such that there is a successive frequency division of 5, 7 and 5 in the respective stages. These frequency divisions are clearly shown in Figs. 3, 4 and 5 which disclose typical wave-forms appearing at their test points 55, 56 and 57 respectively. As a result of the frequency divisions of the initial frequency of 31.5 kc. in the output of oscillator 12, the output signal frequency of stages 14, 16, 18 and 20 will be 10,500, 2,100, 300 and 60 cycles, respectively.

The lowest count-down oscillator 20 is further provided in its cathode and plate circuits with load resistors 58 and 59, respectively, across which a pair of output signals are taken. These signals, which have a frequency of 60 cycles but are 180° out of phase with each other, are applied through a pair of coupling capacitors 61 to a conventional diode phase-comparator circuit 22. Also applied to the phase-comparator circuit by means of decoupling network 62 inserted across capacitors 61 is the 60 cycle alternating current power supply line. Preferably, the input potential of the supply line is made approximately 6.3 volts. Phase-comparator circuit 22 compares the relative phases of the count-down oscillator signal and the sinusoidal waves of the power supply line in a conventional manner by means of oppositely arranged diodes 62 and 65 and filtering network 66. Conventionally, the arrangement is such that when the relative phases of the two inputs are the same, substantially equal, opposed-polarity potentials are developed across load resistors 67 and 68 so that they balance or neutralize each other. As such, no potential signal appears at common junction 69 of resistors 67 and 68. However, when the phases of the signal inputs to circuit 22 differ, indicating that the 60 cycle wave of the power line is out of phase with the output from oscillator 20, a D.-C. bias or potential signal appears at terminal 69 having a polarity depending upon the relative direction of phase shift and on amplitude corresponding to the amount of phase shift.

This D.-C. potential or bias is applied directly to D.-C. amplifier 24 which comprises an electronic triode tube 71 having the usual cathode, plate and control grid elements. The cathode of tube 71 is grounded through a suitably biasing resistor while the plate is connected to the B+ power supply through load and voltage dropping resistors 73 and 33, respectively. A by-pass capacitor 74 is also connected to the plate and grounded. The control grid of this tube is connected directly to terminal 69 and to ground through a manual switch 72. As will become apparent, closing of switch 72 passes the potential signal appearing at terminal 69 to ground for providing free operation of the various oscillator circuits relative to the power line while opening of switch 72 permits the locking of the oscillators to the 60 cycle power line.

The output signal from amplifier 71 is taken across resistor 73 and employed to lock the count-down and master oscillators to the 60 cycle power-line. For this purpose, the signal is applied, in parallel circuit, to the control grids of each oscillator stage through its respective grid-leak resistors. Since a potential signal will only be derived in the phase-comparator circuit when the frequency of the signal from count-down oscillator 20 is out of phase with the 60 cycle frequency of the power line, no potential signal will appear on the control grids when the master oscillator and count-down oscillators are in step with the power line. However, a D.-C. bias signal will be developed and applied to the grids whenever the oscillators are out of step with the 60 cycle power-line. This bias signal controls the oscillation cycle of the oscillators by controlling the initial bias on their control grids and thus, by determining when the oscillators will trigger into oscillation. Should a positive potential signal be applied to the control grids, the oscillators will trigger sooner than their normal trigger point but when a negative potential signal is applied, the triggering is delayed. In this manner, the master and count-down oscillators are locked in time relation with the power line.

It will be seen from the foregoing that the instant invention provides a simply constructed and exceptionally stable electrical interlaced timer for generating synchronizing pulses in a video transmitting apparatus. Moreover, due to the high-side coupling employed in the circuit, the individual stages can be easily and quickly adjusted without interfering or reacting with adjoining stages and fewer components, which otherwise would be necessary for isolation between the stages, are needed in the unit.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. An electrical interlaced timer for generating synchronizing signals comprising, a primary generating means for producing a signal having a first frequency, said generating means including an electronic tube having a plate element, a frequency divider chain including a plurality of electronic tubes each of which has a plate element, said frequency divider chain being controlled by said primary generating means for producing signals having submultiple frequencies of said first frequency, direct-current conductive means for coupling said primary generator means with said frequency divider chain and for coupling each tube in said chain with the next succeeding tube comprising a plurality of resistance elements one of which is interposed between each pair of plate elements, said direct-current conductive means conducting control pulses from said primary generator means to the first tube in said chain and conducting control pulses from each tube in said chain to the next succeeding tube in said chain, means comparing an output signal from said divider chain and a power-line frequency for developing a potential signal having a value depending upon the relative phase of the power line and divider chain frequencies, and means for applying said potential signal to the generating means and divider chain in parallel arrangement for electrically locking said generator means and divider chain to the power line.

2. An electrical interlaced timer for generating synchronizing impulses comprising, a master oscillator for generating a signal having a first frequency, a frequency divider chain including a first, second, third and fourth count-down oscillators serially arranged with the primary oscillator, each of said count-down oscillators being controlled by the preceding oscillators for generating a signal having a submultiple frequency of said first frequency such that each succeeding count-down oscillator generates a signal having a lower frequency than the frequency of the preceding oscillator signal, said oscillators having an inductive load in their output circuit, direct-current conductive means for serially coupling the oscillators together for transmitting control signals from said master oscillator to said first count-down oscillator and from each of said count-down oscillators to the next succeeding count-down oscillator comprising a resistance element connected between the output circuits of adjoining oscillators and the inductive load of the succeeding one of said adjoining oscillators, said resistance element and inductive load for each pair of oscillators forming a differentiating coupling circuit between the two adjoining oscillators, means for comparing the phase of an input power-line frequency and the frequency of the output signal from the fourth oscillator for developing a potential signal having a value depending upon the relative phase of the compared frequencies, and means for applying the potential signal to each oscillator in parallel arrangement for electrically locking said oscillators to the power line.

3. In an electrical generating apparatus, a first, second and third oscillator each of which includes an electron tube having a plate and control grid, an inductive coupling circuit connected between the plate and control grids of each tube, and R-C timing circuit in the control grid circuit of each tube and adjusted such that the first oscillator oscillates at a first frequency, the second oscillator oscillates at a first submultiple frequency of said first frequency, and said third oscillator oscillates at a submultiple frequency of said first frequency and submultiple frequency, means coupling said first, second and third oscillators together for transmitting oscillations from said first oscillator to said second oscillator to control said second oscillator and for transmitting oscillations from said second oscillator to said third oscillator to control said third oscillator, said last-named means comprising a pair of series connected resistors one of which is connected between the plates of said first and second oscillators and the other of which is connected between the plates of said second and third oscillators.

4. In an electrical generating apparatus, a master oscillator and a frequency divider chain comprising a series of count-down oscillators, each of said oscillators including an electronic tube having a plate and control grid, a coupling transformer having a first winding connected to the plate and a second winding connected to the control grid, a timing circuit including a capacitor connected between the second winding and the control grid and a variable resistance having one terminal connected to the control grid, direct-current conducting means for serially coupling said master oscillator and count-down oscillators together comprising a plurality of series connected resistors one of which is connected between the plates of each pair of adjoining oscillators, said direct-current conductive means conducting pulses from said master oscillator to the first count-down oscillator and conducting control pulses from each of said count-down oscillators to the next succeeding one of said count-down oscillators in said series, and means connected to the other terminals of all of the variable resistances for applying a potential signal to the control grid of each tube.

5. In an apparatus as defined in claim 4 but further characterized by said last-named means comprising a phase-comparator circuit having an alternating current power-like potential and an output signal from said frequency divider chain injected therein, said phase-comparator circuit developing said potential signal whenever the frequency of said output signal differs in phase with the frequency of the power line such that the potential signal acts to electrically lock the frequency of the oscillators to the frequency of the power line.

6. In an electrical generating apparatus, a master oscillator and a frequency divider chain comprising a series of count-down oscillators, each of said oscillators including an electronic tube having a plate and control grid, a coupling transformer having a first winding connected to the plate and a second winding connected to the control grid, a timing circuit including a capacitor connected between the second winding and the control grid and a variable resistance having one terminal connected to the control grid, means for serially coupling said master oscillator and count-down oscillators together comprising a plurality of series connected resistors one of which is connected between the plates of each pair of adjoining oscillators, each of said coupling resistors conducting controlling pulses from one to the other of the two oscillators to which it is connected, means connected to the other terminals of all of the variable resistances for applying a potential signal to the control grid of each tube, and impedance networks including said variable resistances interconnecting said grids, each of said networks presenting a substantially equal impedance to alternating currents of all of the frequencies of oscillation of said oscillators.

7. In an electrical generating apparatus, a frequency-divider chain comprising a series of count-down blocking oscillators each producing pulses; each of said oscillators comprising an electronic tube having a plate and a grid-cathode circuit, and a transformer having a primary winding connected between the plate and a source of plate potential and having a secondary winding in said grid-cathode circuit; and direct-current conductive coupling means connecting each of said oscillators to the next succeeding oscillator in said series for transmitting pulses from said each oscillator to the next succeeding oscillator, said coupling means comprising resistance means connected directly between the plate of the tube in said each oscillator and the plate of the tube in said next succeeding oscillator.

8. In an electrical generating apparatus, a frequency-divider chain comprising a series of count-down blocking oscillators each producing pulses; each of said oscillators comprising an electronic tube having a plate and a grid-cathode circuit, and a transformer having a primary winding connected between the plate and a source of plate potential and having a secondary winding in said grid-cathode circuit; and direct-current conductive coupling means connecting each of said oscillators to the next succeeding oscillator in said series for transmitting pulses from said each oscillator to the said next succeeding oscillator, said coupling means comprising resistance means connected directly between the plate of the tube in said each oscillator and the plate of the tube in said next succeeding oscillator and the primary winding which is connected to the plate of the tube in said next succeeding oscillator.

9. In an electrical generating apparatus, a frequency-divider chain comprising a series of count-down blocking oscillators each producing pulses; each of said oscillators comprising an electronic tube having a plate and a grid-cathode circuit, and a transformer having a primary winding connected between the plate and a source of plate potential and having a secondary winding in said grid-cathode circuit; and direct-current conductive differentiating coupling means for applying pulses from each of said oscillators to the next succeeding oscillator in said series for controlling said next succeeding oscillator comprising resistance means connected between the plates of the tubes in said each oscillator and in said next succeeding oscillator and the primary winding which is connected to the plate of the tube in said next succeeding oscillator.

References Cited in the file of this patent

UNITED STATES PATENTS

| | | |
|---|---|---|
| 2,350,536 | Schlesinger | June 6, 1944 |
| 2,555,038 | Jones | May 29, 1951 |
| 2,602,140 | Fink | July 1, 1952 |
| 2,636,989 | Chick | Apr. 28, 1953 |
| 2,638,549 | Woodbury | May 12, 1953 |
| 2,677,059 | Pike et al. | Apr. 27, 1954 |

UNITED STATES PATENT OFFICE
CERTIFICATE OF CORRECTION

Patent No. 2,845,535 July 29, 1958

John R. Kruse, Jr.

It is hereby certified that error appears in the printed specification of the above numbered patent requiring correction and that the said Letters Patent should read as corrected below.

Column 7, line 19, for "power-like" read -- power-line --; column 8, line 6, after "the" insert -- said --.

Signed and sealed this 31st day of March 1959.

(SEAL)
Attest:

KARL H. AXLINE
Attesting Officer

ROBERT C. WATSON
Commissioner of Patents